United States Patent [19]

Maine

[11] 4,165,409
[45] Aug. 21, 1979

[54] METHOD OF FABRICATING WOOD COMPOSITE PANELS HAVING ENHANCED FIRE RETARDANCY

[76] Inventor: Jack Maine, Jefferson Apts., Saginaw, Mich. 48605

[21] Appl. No.: 880,378

[22] Filed: Feb. 23, 1978

[51] Int. Cl.² .............................................. B32B 31/12
[52] U.S. Cl. ...................................... 428/535; 156/314; 427/297; 427/393; 427/351; 428/106; 428/541; 428/921; 428/512; 156/75
[58] Field of Search .................. 428/535, 920, 921, 445, 428/541, 106, 513, 512; 427/297, 393, 351; 156/75, 314

[56] References Cited

U.S. PATENT DOCUMENTS

| 2,601,284 | 6/1952 | Hemming et al. | 428/512 |
| 3,560,255 | 2/1971 | Maine | 428/541 |
| 3,790,401 | 2/1974 | Maine | 427/297 |
| 4,038,451 | 7/1977 | Brown | 428/921 |

Primary Examiner—George F. Lesmes
Assistant Examiner—E. Rollins Buffalow
Attorney, Agent, or Firm—Robert L. McKellar

[57] ABSTRACT

What is disclosed is a method of fabricating wood composite panels having enhanced fire retardancy. The panels so fabricated have hard, durable finished surfaces which allow machine finishing without the concurrent loss in fire retardancy due to the finishing operation.

3 Claims, No Drawings

METHOD OF FABRICATING WOOD COMPOSITE PANELS HAVING ENHANCED FIRE RETARDANCY

BACKGROUND OF THE INVENTION

The major objective of this invention is to produce wood composite structures that have a combination of aesthetically appearing durable finished surfaces and fire retardancy. This particular combination has long been sought and many methods have been described to achieve such an effect.

The wood composite structures of this invention having the hard durable surfaces means that the panels have been treated so that the treatment is throughout the wood and when the wood is surface finished, the durability and aesthetic appearance of the wood surface is not lost. Further, the fire retardancy of such wood composites is not lost in any degree whatsoever.

There has long existed a hiatus in manufactured wood products between aesthetically appearing wood surfaces and adequate fire retardancy.

Many approaches have been made to achieve wood products which would have both essential properties yet be capable of retaining both essential properties during construction utilizing such wood products.

Heretofore, when wood products were manufactured having both fire retardancy and aesthetically appearing surfaces, the wood products could not be further finished because of the risk of decreasing the aesthetic appearance or the fire retardance or both. In other words, if the wood products needed to be sanded or otherwise finished after being put in place, the fire retardancy was adversely affected because of the removal of some of the fire retardant from the surface thereby exposing raw wood having a greater tendency to ignite.

Further, impregnation of wood products at the factory to ensure adequate fire retardancy often leads to finishes which can not be made to have aesthetically appearing surfaces.

Finally, wood composites have been made which have an extra layer to the composite which is fire retardant. These fire retardant layers, however, have to be overlaid with decorative layers in order for the panel to be used for decorative purposes. If this is done, then the overlay is either non-fire retardant or is subject to the problems discussed above. Such wood composites can be found, for example, in U.S. Pat. No. 1,987,506 issued Jan. 8, 1935 to James R. Fitzpatrick. The panels are constructed such that there is incorporated a sheet of asbestos between a sound damping soft core and a composite made up of a poplar or soft wood core and a decorative wood overlay. In the event of a fire, the soft sound damping core would be protected but the outer composite of softwood core and decorative overlay would probably be consumed.

U.S. Pat. No. 3,501,339, issued Mar. 17, 1970 to Arthur Gurgiolo shows a method of treating wood products with specific flame retardant materials.

Gurgiolo allegedly solves the problem discussed above, that is, the problem of destroying fire retardancy when wood products containing fire retardants on their surfaces are cut to expose raw wood surfaces, by treating such woods with alkyl or aryl halogenated phosphites or phosphonates. Gurgiolo, however, does not indicate or discuss the effect of the treatment as regards fine finishing of the wood after it is impregnated. The essence of the patent seems to be the fire retardancy and preservation of rough woods such as would be used for building construction. Compatibility of the fire retardants with other impregnation materials is not contemplated or discussed therein.

U.S. Pat. No. 3,817,822, issued June 18, 1974 to David Haddon Dawes describes the pre-impregnation of two panels and their subsequent gluing together via the use of a polyethylene based glue to form a composite which is fire retardant. The patent describes the added advantage of having a glue which is not affected by the use of fire retardants in the wood panels. The patent does not describe the use of fire retardants with wood that requires fine finishing nor does it describe what one needs to do to acquire woods having both fire retardancy and the ability to be finished.

Thus, the problem of having fire retardancy in a wood product which can be fine finished and still retain the fire retardant property, has not been resolved.

The following described invention has solved that problem.

THE INVENTION

This invention deals with a method of fabricating flame retardant wood panel composites which have durable fine finished surface properties.

The wood panel composites disclosed herein are those wood composites which have polymer impregnation as described in U.S. Pat. Nos. 3,560,255 and 3,790,401 issuing Feb. 2, 1971 and Feb. 5, 1974 to Jack Maine, and useful in the manufacture of furniture, flooring, paneling or the like. Thus, it is known from such patents that wood and wood fibers can be impregnated with curable polymers to have tough, protective surfaces.

New fire retardant materials which can be impregnated into wood are also known from U.S. Pat. No. 4,038,451, issued July 26, 1977 to Frederick L. Brown et al. Such materials give cellulosic substrates a certain degree of fire retardancy and it is noted that the fire retardant materials are leach resistant.

The technology in the three latter patents is incorporated in the present invention, in part, since the tertiary butylstyrene and the fire retardant compositions of Brown and the methods of their use form part of the process of this invention and are incorporated herein by reference.

The instant invention consists of a method of enhancing the fire retardancy of fabricated wood panel systems which method consists of (A) impregnating a first or outer wood member with an aqueous based fire retardant; (B) impregnating the product of (A) with a material selected from the group consisting of (i) curable tertiary butylstyrene and (ii) mixtures of curable tertiary butylstyrene and a solvent based flame retardant different than the flame retardant in (A); (C) impregnating a second or core wood member with a fire retardant as in (A) and drying; (D) forming a composite structure from the product of (A) and (B) and the product of (C) by gluing the wood members together and, (E) attaching a third or balance wood member to the remaining core face opposite the first wood member, whereby a fire retardant composite fabricated wood panel is obtained.

Step (A) of the invention consists of impregnating a first or outer wood member with a fire retardant material. This outer member consists of a panel of decorative wood usually selected from mahogany, pine, walnut, teakwood, oak and the like. This panel is customarily a panel having a thickness of less than ½", usually it is ⅛" or less in thickness. This panel is impregnated with a fire retardant chemical and for purposes of illustration, the fire retardant is a composition shown essentially as in Example 1 of U.S. Pat. No. 4,038,451, although other aqueous based compositions give essentially the same effect, for example, the liquid compositions described in "Liquid Phosphate Fire Retardant Concentrates," R. W. Johansen and G. L. Crow. Fire Control Notes 26, No. 2, USDA Forest Service, Washington, D.C. (April 1965). The method used for impregnation in step (A) is not critical as long as the wood panel is thoroughly impregnated. Generally, the wood is treated using a vacuum-pressure technique such as used in U.S. Pat. No. 3,790,401. This panel is then allowed to dry.

Step (B) constitutes the further impregnation of the impregnated wood from step (A). The second or further impregnation is made essentially by the process shown in U.S. Pat. No. 3,790,401 except that for some uses, depending on the end-use of the wood, the material impregnant contains a different fire retardant chemical. Thus, the invention contemplates two situations: one where step (B) introduces only curable tertiary butylstyrene into the fire retardant impregnated panel and a second situation where curable tertiary butylstyrene and an additional solvent based fire retardant are introduced into the aqueous based fire retardant impregnated panel.

In the first situation, the curable tertiary butylstyrene is impregnated into the wood by the process of U.S. Pat. No. 3,790,401. One should remember that the inventive process differs from U.S. Pat. No. 3,790,401, in that, the material being impregnated is already impregnated by an aqueous fire retardant chemical and care must be taken to use only certain fire retardant chemicals that will not repulse the curable tertiary butylstyrene or in any way impair the utility of the curable tertiary butylstyrene as patented in U.S. Pat. No. 3,790,401.

In the second situation, the problem of incompatibility is more complex because of the use of an additional solvent based fire retardant in the curable tertiary butylstyrene, one which is different from the aqueous based fire retardant used in (A) but which is compatible with curable tertiary butylstyrene and one which is not repulsed by the aqueous based fire retardant used in step (A).

The solvent based fire retardants used in step (B) can be the Fyrol® line of organophosphorus compounds manufactured by the Stauffer Chemical Company, Westport Conn. Especially useful is Fyrol® CEF. These fire retardants are compatible with the curable tertiary butylstyrene compositions and are not repulsed by the aqueous based fire retardants used in step (A).

After the wood is impregnated as in step (B), then it is cured with the use of crosslinkers and catalysts, hence the term "curable" tertiary butylstyrene. Normally, the composition used in (B) is mixed with the crosslinkers and catalyst before the impregnation is carried out. Such crosslinkers and catalysts are illustrated in U.S. Pat. No. 3,560,255. One example of a suitable crosslinker is ethylene glycol dimethacrylate. Examples of suitable catalysts are the azo type catalysts such as $\alpha,\alpha'$-azobisisobutyronitrile. Peroxides are also useful in this invention such as benzoyl peroxide, dicumylperoxide and the like.

After the product in step (B) is impregnated and cured, the product is allowed to cool.

In step (C), a second or core wood member is impregnated with a fire retardant as in step (A). Especially suited for this step is the fire retardant used as in step (A). The aqueous based fire retardant appears to give a better fire retardant effect than other common solvent based fire retardants in the presence of curable tertiary butylstyrene.

After the impregnation in (C), a composite structure is formed wherein the product of (B) is surmounted on the product from (C), and each is glued to the other, compressed, and allowed to dry. Finally, a third wood member, a balance panel is glued to the remaining surface of the core member. This balance wood member can or cannot be impregnated with a fire retardant.

The core member is usually made from the less expensive woods such as luan or basswood.

The balance member is usually made from such woods as oak or aspen which are materially strong. The balance member is used to keep the core and the outer member from warping and twisting.

When all the members are glued and compressed, a sandwich-type product is formed. This sandwich-type product is thus fire retardant beyond what one would expect from a simple use of fire retardants in the first member yet one can obtain a very thin veneer finish wood with a hard durable machineable finish.

Now, so that those skilled in the art can better understand and appreciate the invention, the following examples are presented.

Several panels measuring approximately 23⅝ inches in length, 3⅝ inches wide and thicknesses as shown below were prepared in the following manner:

The outer or first wood members were fashioned from 1/40 inch thick walnut wood and some were impregnated with a composition which was an aqueous solution of 12 parts by weight of polyethyleneimine having an average molecular weight of from 40,000 to 60,000 and a Brookfield viscosity (at 5% solids) of 28 cps at 25° C. and 88 parts by weight of a 40/60 weight percent mixture of mono/diammonium phosphate. The aqueous solution was 20% solids. The treatment was a vacuum-pressure treatment. After the walnut members were dried, some were then subjected to an impregnation using a mixture of tertiary butylstyrene monomer, a carrier for the monomer, a glycol crosslinker, a catalyst and in some cases Fyrol® CEF.

The fire-retardant containing TBS contained 100 pounds TBS, 7 pounds of glycol and 0.75 pounds of catalyst and 20 pounds of Fyrol® CEF which was 50% in methylene chloride solvent. The crosslinkers useful in this invention are acrylate functional glycols or polyglycols such as a dimethacrylate or diacrylate of ethylene glycol. In the above example, the crosslinker was ethylene glycol dimethacrylate.

The walnut members were then cured at 160° F. and then dried and allowed to cool. Core members, comprising ¼" thick luan or basswood were then glued to the walnut members. Some of the core members were first impregnated as were the walnut members in the first step of the process, using the polyalkyleneimine-phosphorus aqueous solution. A final panel, which was a balance member of aspen of 1/32 inch thickness was then glued to the backside of the core member. These balance members were not impregnated. The entire sandwich was then compressed and allowed to dry.

The tests were carried out on a two-foot Monsanto tunnel test to determine flame retardancy. Details of this test can be found in "Journal of Paint Technology,"

Volume 39, No. 511, August 1967. The values reported herein were calculated using the formulas found in that publication and correlated with ASTM E84-61 (the 25 foot tunnel test). Results from this test can be roughly extrapolated to indicate the performance of the panels in the 25 foot tunnel test ASTM No. E84-61. The results are reported as the average of 3 runs.

| | Face Panel | | | | |
|---|---|---|---|---|---|
| | Impregnated With | | | Core Panel | Composite |
| Run No. | Polyalkyl- eneimine Fire Retardant | TBS Only | Fyrol® +TBS | Treated With Polyalkyl- eneimine | Flame Spread Rating Result |
| 1 | yes | — | yes | yes | 39.2 |
| 2 | yes | yes | no | yes | 43.0 |
| 3 | no | yes | no | no | T** |
| 4 | yes | no | yes | no | 99.4 |
| 5 | no | no | yes | yes | T |
| 6 | no | yes | no | yes | 122.5 |
| 7 | no | no | no | no | T |
| 8 | Lacquer Coat | no | no | no | T |
| 9 | Lacquer Coat | no | no | yes | 117.1 |
| 10 | no | yes | no | yes | 122.0 |

TBS = tertiary butyl styrene
T** = Flame out of the tunnel

Run #1 is one aspect of this invention and has the best value of 39.2. The Run #2 is the other aspect of this invention and has a good value of 43. Comparisons can be made between these two values and the other treatments listed thereunder. Thus, this data shows that the TBS treatment outlined in U.S. Pat. Nos. 3,790,401 and 3,560,225 is not a fire-retarded product. Run #4 shows that treatment of the face panel with fire retardant and the subsequent treatment with fire retardant and TBS i.e. steps (A) and (B) of this invention, do not suffice to give an enhanced flame retardancy, the core must also be fire retardant. Run #5 shows that core impregnation and fire retardant plus TBS on the face panel does not give enhanced fire retardancy. Run #6 shows that a fire retardant core with TBS treated face is not effective either. A duplicate of this run can be found in Run #10. A plain composite was run in Run #7. The same type of plain composite with a lacquer coat was run in Run #8 and the same thing was run in Run #9 except that the core was fire retardant.

In summary, the core and the face panel both have to be impregnated with a fire retardant to give effective fire retardant results. The use of the TBS with additional fire retardant gives even better results in fire retardancy but in addition gives a hard, durable machineable surface for fine finishing without decreasing the fire retardancy.

That which is claimed is:

1. A method of enhancing the fire retardancy of fabricated wood panel systems which method consists of
   (A) impregnating a first or outer wood member with an aqueous based fire retardant consisting of a mixture of polyethyleneimine and a mixture of monoammonium phosphate and diammonium phosphate;
   (B) impregnating the product of (A) with a material selected from the group consisting of
      (i) curable tertiary butylstyrene and
      (ii) mixtures of curable tertiary butylstyrene, a haloalkyl phosphate flame retardant different than the flame retardant in (A), a crosslinking agent for the tertiary butyl styrene and a catalyst for curing; and then curing said tertiary butylstyrene;
   (C) impregnating a second or core wood member with a fire retardant as in (A) and drying;
   (D) forming a composite structure from the product of (A) and (B) and the product of (C) by gluing the wood members together and,
   (E) attaching a third or balance wood member to the remaining core face opposite the first wood member, whereby a fire retardant composite fabricated wood panel is obtained.

2. A method as claimed in claim 1 wherein the flame retardant in (A) and (C) is an aqueous mixture of 12 parts by weight of polyethyleneimine and 88 parts by weight of a 40/60 weight percent mixture of monoammonium phosphate and diammonium phosphate wherein the amount of the polyethyleneimine and phosphates is based on the total amount of polyethyleneimine and phosphates present and, the flame retardant in (B)(ii) is tris-(beta chloroethyl) phosphate.

3. A composite fabricated wood panel prepared in accordance with claim 1.

* * * * *